(12) United States Patent
Wang et al.

(10) Patent No.: US 12,057,129 B2
(45) Date of Patent: Aug. 6, 2024

(54) AUDIO CODING METHOD AND APPARATUS

(71) Applicant: Huawei Technologies Co., Ltd., Guangdong (CN)

(72) Inventors: Zhuo Wang, Shenzhen (CN); Meng Wang, Shenzhen (CN); Fan Fan, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 244 days.

(21) Appl. No.: 17/697,455

(22) Filed: Mar. 17, 2022

(65) Prior Publication Data

US 2022/0208200 A1 Jun. 30, 2022

Related U.S. Application Data

(63) Continuation of application No. PCT/CN2020/115123, filed on Sep. 14, 2020.

(30) Foreign Application Priority Data

Sep. 18, 2019 (CN) .......................... 201910883038.0

(51) Int. Cl.
*G10L 19/005* (2013.01)
*G06N 3/08* (2023.01)
(Continued)

(52) U.S. Cl.
CPC .............. *G10L 19/005* (2013.01); *G06N 3/08* (2013.01); *G10L 19/008* (2013.01);
(Continued)

(58) Field of Classification Search
CPC ... G10L 19/005; G10L 19/008; G10L 19/167; G06N 3/08; H04R 3/12; H04R 2420/07
See application file for complete search history.

(56) References Cited

U.S. PATENT DOCUMENTS

| 5,185,800 A | 2/1993 | Mahieux |
| 7,634,413 B1 | 12/2009 | Kuo et al. |

(Continued)

FOREIGN PATENT DOCUMENTS

| CA | 2461830 C | * 9/2009 | ............. G06F 15/16 |
| CA | 3080907 A1 | * 5/2019 | ........... F16D 43/206 |

(Continued)

OTHER PUBLICATIONS

ISO/IEC JTC 1/SC 29/WG 11, ISO/IEC 14496-3:/Amd. 1:1999(E), Information technology—Coding of audio—visual objects—Part 3: Audio, 199 pages.

(Continued)

*Primary Examiner* — Mohammad K Islam
(74) *Attorney, Agent, or Firm* — WOMBLE BOND DICKINSON (US) LLP

(57) ABSTRACT

An audio coding method and apparatus are provided. The audio coding method includes: obtaining first audio data; obtaining a target bit rate and a Bluetooth packet type, where the target bit rate and the Bluetooth packet type correspond to a current status of a Bluetooth channel; obtaining one or more of a bit pool parameter set, a psychoacoustic parameter set, and a spectrum bandwidth parameter set by using a neural network obtained through pre-training based on the first audio data, the target bit rate, and the Bluetooth packet type; and coding the first audio data based on one or more of the bit pool parameter set, the psychoacoustic parameter set, and the spectrum bandwidth parameter set to obtain a to-be-sent bit stream. The status of the Bluetooth channel can be adaptively matched, and continuous audio listening experience is provided when audio quality is maximally ensured.

18 Claims, 7 Drawing Sheets

(51) Int. Cl.
*G10L 19/008* (2013.01)
*G10L 19/16* (2013.01)
*H04R 3/12* (2006.01)

(52) U.S. Cl.
CPC .............. *G10L 19/167* (2013.01); *H04R 3/12* (2013.01); *H04R 2420/07* (2013.01)

(56) References Cited

U.S. PATENT DOCUMENTS

| | | | |
|---|---|---|---|
| 8,010,370 | B2 | 8/2011 | Baumgarte |
| 11,889,281 | B2* | 1/2024 | Goupy ................. H04W 76/40 |
| 2009/0099851 | A1* | 4/2009 | Pilati ..................... G10L 19/002 |
| | | | 704/500 |
| 2010/0121632 | A1 | 5/2010 | Chong |
| 2012/0296658 | A1* | 11/2012 | Smyth ..................... G10L 19/22 |
| | | | 704/500 |
| 2013/0304458 | A1* | 11/2013 | Shavit ..................... G10L 19/22 |
| | | | 381/98 |
| 2019/0132591 | A1* | 5/2019 | Zhang ..................... H04N 19/59 |
| 2019/0164052 | A1 | 5/2019 | Sung et al. |
| 2019/0213324 | A1 | 7/2019 | Thorn |
| 2022/0191615 | A1* | 6/2022 | Goupy ................. H04W 4/029 |
| 2024/0022787 | A1* | 1/2024 | Aksu ........................ G06N 3/04 |
| 2024/0033624 | A1* | 2/2024 | Phillips ................. A63F 13/352 |

FOREIGN PATENT DOCUMENTS

| | | | | | |
|---|---|---|---|---|---|
| CN | 1208489 | A | * | 2/1999 | ......... G10L 19/0208 |
| CN | 1677492 | A | | 10/2005 | |
| CN | 101136202 | A | | 3/2008 | |
| CN | 101163248 | A | | 4/2008 | |
| CN | 101308659 | A | | 11/2008 | |
| CN | 101350199 | A | | 1/2009 | |
| CN | 101847413 | A | | 9/2010 | |
| CN | 101853663 | A | | 10/2010 | |
| CN | 102436819 | A | | 5/2012 | |
| CN | 102479514 | A | | 5/2012 | |
| CN | 103532936 | A | | 1/2014 | |
| CN | 109785847 | A | | 5/2019 | |
| CN | 109981545 | A | | 7/2019 | |
| JP | 2015505991 | A | | 2/2015 | |
| JP | 2022548299 | A | * | 9/2020 | ............... G06N 3/08 |
| KR | 102626677 | B1 | * | 3/2015 | ........... G10L 19/008 |
| WO | 2005096273 | A1 | | 10/2005 | |

OTHER PUBLICATIONS

ISO/IEC 13818-7, Third edition Oct. 15, 2004, Information technology-Generic coding of moving pictures and associated audio information—Part 7:Advanced Audio Coding (AAC), 206 pages.

* cited by examiner

AUDIO CODING METHOD AND APPARATUS

CROSS-REFERENCE TO RELATED APPLICATIONS

This application is a continuation of international application PCT/CN2020/115123, filed on Sep. 14, 2020, which claims priority to Chinese Patent Application No. 201910883038.0, filed on Sep. 18, 2019. The disclosures of the aforementioned applications are hereby incorporated by reference in their entireties.

TECHNICAL FIELD

This application relates to the audio processing technologies, and in particular, to an audio coding method and apparatus.

BACKGROUND

As wireless Bluetooth devices such as a true wireless stereo (TWS) headset, a smart sound box, and a smart watch are widely used in daily life, a requirement of people for pursuing high-quality music playing experience in various scenarios becomes increasingly urgent. Because a data transmission size is limited by a Bluetooth channel, audio data can be transmitted to a receive end of the Bluetooth device for decoding and playing only after data compression is performed on the audio data by an audio encoder of a transmit end of the Bluetooth device. Currently, mainstream Bluetooth coding and decoding technologies include default advanced audio distribution profile (A2DP) sub-band coding (SBC), moving picture experts group (MPEG) advanced audio coding (AAC), Sony LDAC, Qualcomm aptX, and the like.

Currently, in an audio transmission process, audio quality highly depends on throughput and stability of a Bluetooth connection link. When channel quality of the Bluetooth connection link is interfered, the audio data is lost in the transmission process once a bit rate fluctuates greatly. In addition, during audio playing, sound stuttering and interruption occur, which greatly affects user experience. A bit rate fluctuation range may be controlled by using related technologies. However, this control method is relatively rough, which cannot ensure both sound continuity and audio quality.

SUMMARY

This application provides an audio coding method and apparatus, to adaptively match a status of a Bluetooth channel and maximally ensure audio quality while providing continuous audio listening experience.

According to a first aspect, this application provides an audio coding method, including:
obtaining first audio data; obtaining a target bit rate and a Bluetooth packet type, where the target bit rate and the Bluetooth packet type correspond to a current status of a Bluetooth channel; obtaining one or more of a bit pool parameter set, a psychoacoustic parameter set, and a spectrum bandwidth parameter set by using a neural network obtained through pre-training based on the first audio data, the target bit rate, and the Bluetooth packet type, where a parameter in the bit pool parameter set is used to indicate a quantity of remaining bits in a bit stream that can be used for coding, a parameter in the psychoacoustic parameter set is used to indicate allocation of a quantity of bits required for coding at different frequencies, and a parameter in the spectrum bandwidth parameter set is used to indicate a highest cut-off frequency of an audio spectrum obtained after coding; and coding the first audio data based on one or more of the bit pool parameter set, the psychoacoustic parameter set, and the spectrum bandwidth parameter set to obtain a to-be-sent bit stream.

In this application, based on the audio data, and the target bit rate and the Bluetooth packet type corresponding to the current status of the Bluetooth channel, related parameters for coding are obtained by using the neural network. In this way, the status of the Bluetooth channel can be adaptively matched, and bit rate fluctuation of audio coding can be effectively reduced, to improve anti-interference performance during audio transmission and maximally ensure audio quality while providing continuous audio listening experience.

In an embodiment, the obtaining one or more of a bit pool parameter set, a psychoacoustic parameter set, and a spectrum bandwidth parameter set by using a neural network obtained through pre-training based on the first audio data, the target bit rate, and the Bluetooth packet type includes: performing feature extraction on the first audio data, the target bit rate, and the Bluetooth packet type to obtain a first feature vector; and inputting the first feature vector into the neural network to obtain one or more of the bit pool parameter set, the psychoacoustic parameter set, and the spectrum bandwidth parameter set.

In an embodiment, the Bluetooth packet type indicates a type of a packet transmitted over Bluetooth, and may include any one of 2DH1, 2DH3, 2DH5, 3DH1, 3DH3, and 3DH5.

In an embodiment, the target bit rate is used to indicate an average byte quantity of data packets generated through coding in a specified time period.

In an embodiment, before the obtaining first audio data, the method further includes: constructing a training data set of the neural network, where the training data set includes a correspondence between a first value combination and a second value combination, the first value combination is any one of a plurality of value combinations of the audio data, the target bit rate, and the Bluetooth packet type, the second value combination is one of a plurality of value combinations of the bit pool parameter set, the psychoacoustic parameter set, and the spectrum bandwidth parameter set, the plurality of value combinations of the bit pool parameter set, the psychoacoustic parameter set, and the spectrum bandwidth parameter set correspond to a plurality of ODGs, and the second value combination corresponds to a highest ODG; and obtaining the neural network through training based on the training data set.

In this application, in a training process of the neural network, the target bit rate and the Bluetooth packet type both correspond to the status of the Bluetooth channel. Therefore, an optimal value combination of the bit pool parameter set, the psychoacoustic parameter set, and the spectrum bandwidth parameter set corresponding to the target bit rate and the Bluetooth packet type also corresponds to the status of the Bluetooth channel. It can be learned that a change of the status of the Bluetooth channel and an optimal value combination of related parameters matching the status of the Bluetooth channel are both considered for the neural network.

In an embodiment, the constructing a training data set of the neural network includes: obtaining a plurality of pieces of audio data; separately coding second audio data by using the plurality of value combinations of the bit pool parameter set, the psychoacoustic parameter set, and the spectrum bandwidth parameter set in the first value combination, where the second audio data is any one of the plurality of pieces of audio data; obtaining the plurality of ODGs based on a coding result; determining, as the second value combination, a value combination corresponding to a highest ODG in the plurality of ODGs; and adding the first value combination and the second value combination to the training data set.

According to a second aspect, this application provides an audio coding apparatus, including:

an input module, configured to: obtain first audio data, and obtain a target bit rate and a Bluetooth packet type, where the target bit rate and the Bluetooth packet type correspond to a current status of a Bluetooth channel; a parameter obtaining module, configured to obtain one or more of a bit pool parameter set, a psychoacoustic parameter set, and a spectrum bandwidth parameter set by using a neural network obtained through pre-training based on the first audio data, the target bit rate, and the Bluetooth packet type, where a parameter in the bit pool parameter set is used to indicate a quantity of remaining bits in a bit stream that can be used for coding, a parameter in the psychoacoustic parameter set is used to indicate allocation of a quantity of bits required for coding at different frequencies, and a parameter in the spectrum bandwidth parameter set is used to indicate a highest cut-off frequency of an audio spectrum obtained after coding; and a coding module, configured to code the first audio data based on one or more of the bit pool parameter set, the psychoacoustic parameter set, and the spectrum bandwidth parameter set to obtain a to-be-sent bit stream.

In an embodiment, the parameter obtaining module is specifically configured to: perform feature extraction on the first audio data, the target bit rate, and the Bluetooth packet type to obtain a first feature vector; and input the first feature vector into the neural network to obtain one or more of the bit pool parameter set, the psychoacoustic parameter set, and the spectrum bandwidth parameter set.

In an embodiment, the Bluetooth packet type indicates a type of a packet transmitted over Bluetooth, and may include any one of 2DH1, 2DH3, 2DH5, 3DH1, 3DH3, and 3DH5.

In an embodiment, the target bit rate is used to indicate an average byte quantity of data packets generated through coding in a specified time period.

In an embodiment, the parameter obtaining module is further configured to: construct a training data set of the neural network, where the training data set includes a correspondence between a first value combination and a second value combination, the first value combination is any one of a plurality of value combinations of the audio data, the target bit rate, and the Bluetooth packet type, the second value combination is one of a plurality of value combinations of the bit pool parameter set, the psychoacoustic parameter set, and the spectrum bandwidth parameter set, the plurality of value combinations of the bit pool parameter set, the psychoacoustic parameter set, and the spectrum bandwidth parameter set correspond to a plurality of ODGs, and the second value combination corresponds to a highest ODG; and obtain the neural network through training based on the training data set.

In an embodiment, the parameter obtaining module is specifically configured to: obtain a plurality of pieces of audio data; separately code second audio data by using the plurality of value combinations of the bit pool parameter set, the psychoacoustic parameter set, and the spectrum bandwidth parameter set in the first value combination, where the second audio data is any one of the plurality of pieces of audio data; obtain the plurality of ODGs based on a coding result; determine, as the second value combination, a value combination corresponding to a highest ODG in the plurality of ODGs; and add the first value combination and the second value combination to the training data set.

According to a third aspect, this application provides a terminal device, including:

one or more processors; and a memory, configured to store one or more programs.

When the one or more programs are executed by the one or more processors, the one or more processors are enabled to implement the method according to any one of the embodiments of the first aspect.

According to a fourth aspect, this application provides a computer-readable storage medium, including a computer program. When the computer program is executed on a computer, the computer is enabled to perform the method according to any one of the embodiments of the first aspect.

According to a fifth aspect, this application provides a computer program product. The computer program product includes computer program code. When the computer program code is run on a computer, the computer is enabled to perform the method according to any one of the implementations of the first aspect.

DESCRIPTION OF EMBODIMENTS

To make objectives, technical solutions, and advantages of this application clearer, the following clearly and fully describes the technical solutions in this application with reference to accompanying drawings in this application. It is clear that the described embodiments are some but not all of the embodiments of this application. All other embodiments obtained by a person of ordinary skill in the art based on the embodiments of this application without creative efforts shall fall within the protection scope of this application.

In the embodiments, claims, and accompanying drawings of this specification in this application, the terms "first", "second" and the like are only used for distinction and description, and cannot be understood as indicating or implying relative importance or a sequence. In addition, the terms "include" and "have" and any variants thereof are intended to cover non-exclusive inclusion, for example, include a series of operations or units. A method, system, product, or device is not necessarily limited to those operations or units that are expressly listed, but may include other operations or units that are not expressly listed or inherent to such a process, method, product, or device.

It should be understood that, in this application, "at least one" means one or more, and "a plurality of" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent a, b, c, "a and b", "a and c", "b and c", or "a, b, and c", where a, b, and c may be singular or plural.

Figure 1:
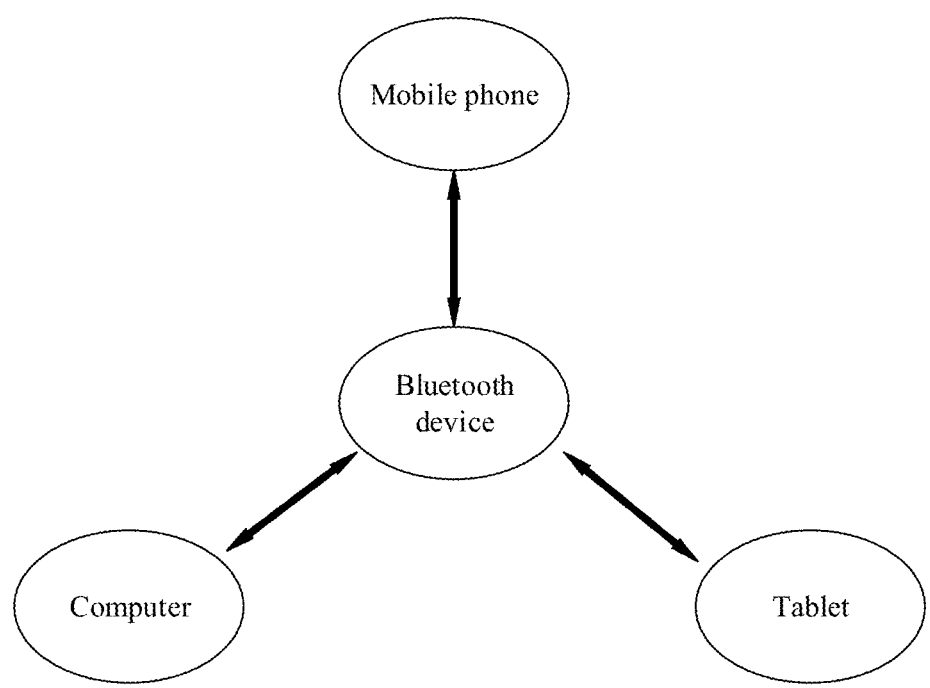
FIG. 1 is an example diagram of an example of an application scenario to which an audio coding method is applied according to this application.

FIG. 1 is an example diagram of an example of an application scenario to which an audio coding method is applied according to this application. As shown in FIG. 1, the application scenario includes a terminal device and a Bluetooth device. The terminal device and the Bluetooth device may be a device that has a Bluetooth connection function and that supports an AAC standard. The terminal device may be, for example, a mobile phone, a computer (including a notebook, a desktop, and the like), or a tablet (including a handheld panel, an in-vehicle panel, and the like). A Bluetooth playing device may be, for example, a TWS headset, a wireless head-mounted headset, or a wireless neckband headset. The Bluetooth device may further be, for example, a smart sound box, a smart watch, smart glasses, or an in-vehicle sound box. A most frequent application scenario in this application is between a mobile phone and a Bluetooth device, that is, between a mobile phone and each of a TWS headset, a wireless head-mounted headset, a wireless neckband headset, and the like, or between a mobile phone and each of a smart sound box, a smart watch, smart glasses, an in-vehicle sound box, and the like. However, this application is not limited thereto.

Figure 2:
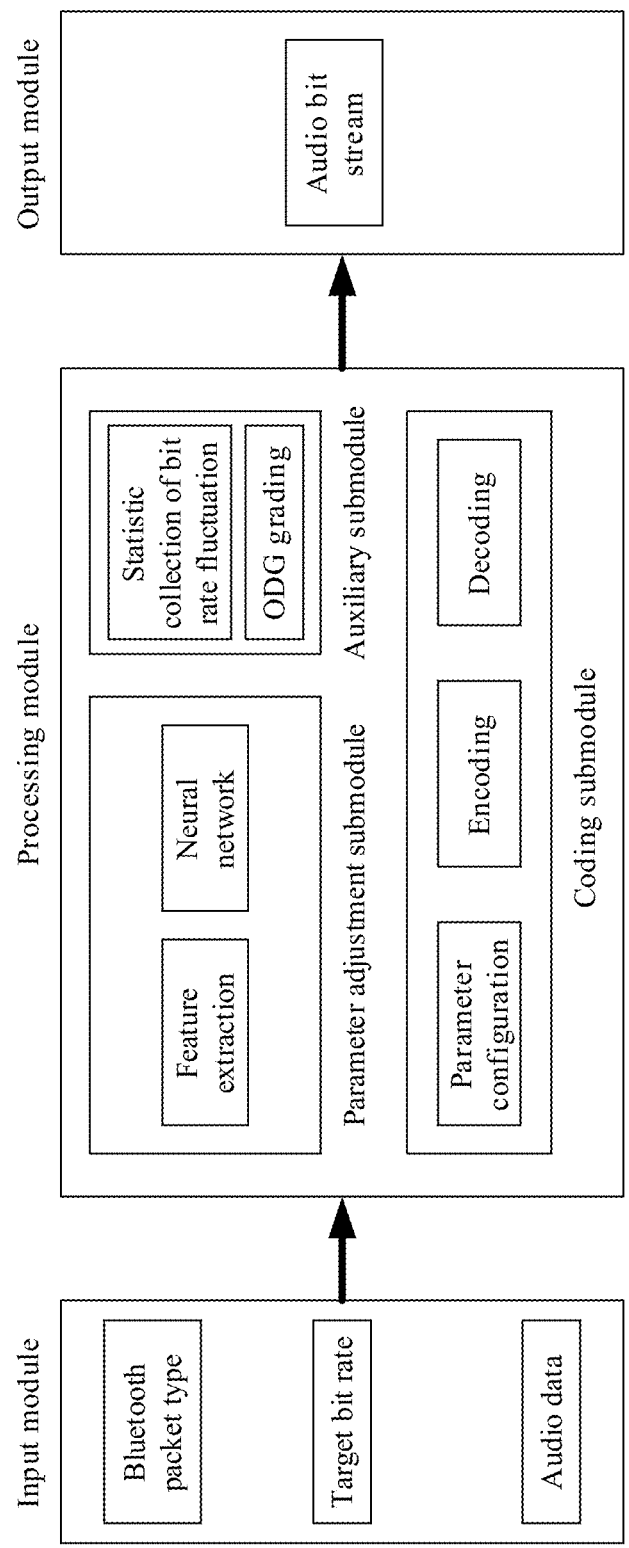
FIG. 2 is an example diagram of an example of an audio coding system according to this application.

FIG. 2 is an example diagram of an example of an audio coding system according to this application. As shown in FIG. 2, the audio coding system includes an input module, a processing module, and an output module.

Data obtained by the input module includes audio data such as an audio pulse code modulation (PCM) bit stream, and a target bit rate and a Bluetooth packet type that are determined based on a status of a Bluetooth channel. The target bit rate and the Bluetooth packet type correspond to a current status of the Bluetooth channel. The target bit rate is used to indicate an average byte quantity of data packets generated through coding in a specified time period. The Bluetooth packet type indicates a type of a packet transmitted over Bluetooth. In a Bluetooth connection link, a Bluetooth packet type used on an asynchronous connection-less (ACL) for transmitting an audio bit stream may include any one of 2DH1 (a data packet in a transmitted audio bit stream may be limited to a maximum of 31 bytes), 2DH3 (a data packet in a transmitted audio bit stream may be limited to a maximum of 356 bytes), 2DH5 (a data packet in a transmitted audio bit stream may be limited to a maximum of 656 bytes), 3DH1 (a data packet in a transmitted audio bit stream may be limited to a maximum of 11 bytes), 3DH3 (a data packet in a transmitted audio bit stream may be limited to a maximum of 536 bytes), and 3DH5 (a data packet in a transmitted audio bit stream may be limited to a maximum of 986 bytes). Herein, a modulation scheme used for 2DH1, 2DH3, and 2DH5 is n/4 differential quadrature reference phase shift keying (DQPSK), and a modulation scheme used for 3DH1, 3DH3, and 3DH5 is 8DQPSK. When Bluetooth is slightly interfered and the channel is in a good state, 2DH5 or 3DH5 is preferentially selected. The two Bluetooth packet types have a higher data transmission capability and a lower anti-interference capability, so that an audio encoder can work at a target bit rate above 128 kbps to implement transmission with higher audio quality. When Bluetooth is greatly interfered and the channel is in a poor state, 2DH3, 3DH3, 2DH1, or 3DH1 is preferentially selected. These Bluetooth packet types have a higher anti-interference capability and a lower data transmission capability, so that the audio encoder can work at a target bit rate below 96 kbps to preferentially ensure continuity of audio transmission.

The processing module includes a parameter adjustment submodule, a coding submodule, and an auxiliary submodule. The parameter adjustment submodule has two functions: feature extraction and training through a neural network; and is configured to determine an optimal value combination of coding parameters based on data input by the input module. The coding submodule has three functions: parameter configuration, coding, and decoding; and is configured to: code the audio data based on the optimal value combination of the coding parameters, and decode the bit stream. The auxiliary submodule has two functions: statistic collection of bit rate fluctuation and subjective difference grading (namely, an ODG), and is configured to: collect statistics of a change of a byte quantity of a data packet generated through coding, and grade audio quality of the audio after coding and decoding. The ODG is obtained through perceptual evaluation of audio quality (PEAQ) in the international telecommunication union (ITU) BS.1387-1. A value range of the grade is −4 to 0. A grade closer to 0 indicates higher audio quality of the audio after coding and decoding.

Data output by the output module is an audio bit stream formed after a data packet generated through coding is encapsulated based on the Bluetooth packet type.

Figure 3:
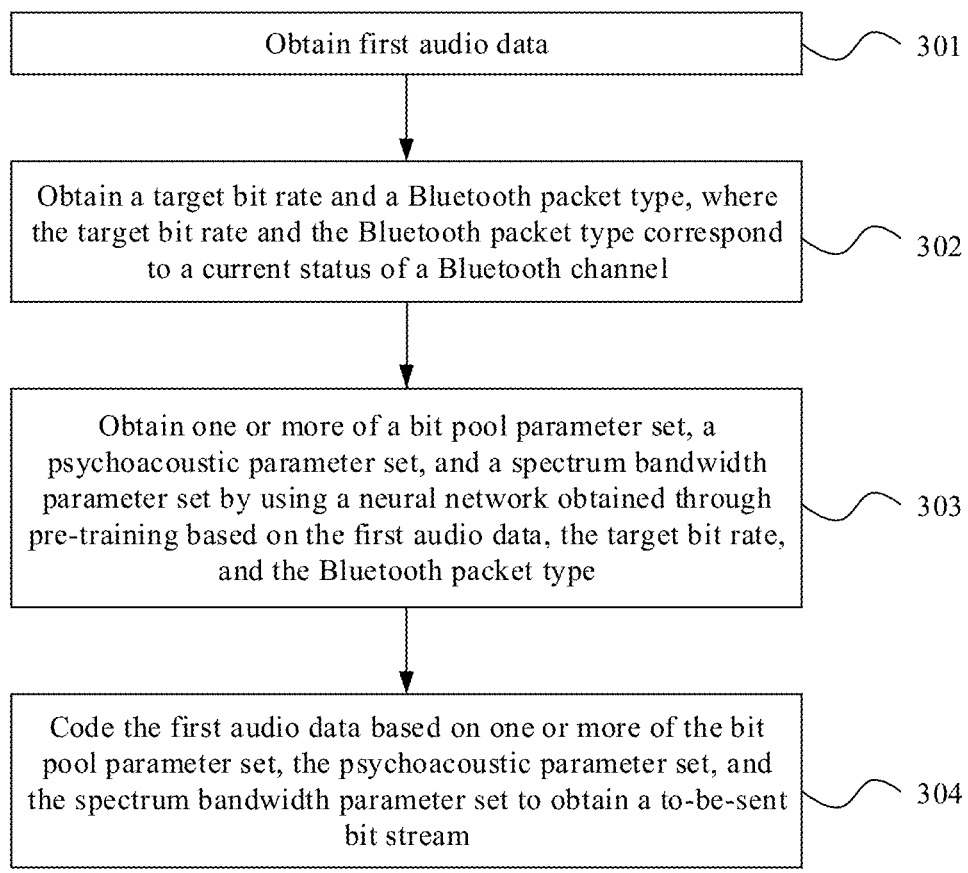
FIG. 3 is a flowchart of an embodiment of an audio coding method according to this application.

FIG. 3 is a flowchart of an embodiment of an audio coding method according to this application. As shown in FIG. 3, the method in this embodiment may be performed by the terminal device in FIG. 1, for example, a mobile phone, a computer (including a notebook, a desktop, and the like), or a tablet (including a handheld panel, an in-vehicle panel, and the like). The audio coding method may include the following operations.

Operation 301: Obtain first audio data.

The first audio data is to-be-coded audio data. The terminal device may directly read the first audio data from a local memory, or may receive the first audio data from another device. This is not specifically limited in this application.

Operation 302: Obtain a target bit rate and a Bluetooth packet type, where the target bit rate and the Bluetooth packet type correspond to a current status of a Bluetooth channel.

The target bit rate is used to indicate an average byte quantity of data packets generated through coding in a specified time period. In other words, it may be considered that the target bit rate is an average byte quantity of the data packets that is expected to be obtained after the first audio data is coded. Due to impact of a plurality of factors, it is less possible that a byte quantity (namely, a bit rate) of each data packet generated through coding reaches the target bit rate. Therefore, it may be allowed that the bit rate of each data packet fluctuates in a small range near the target bit rate, provided that the average bit rate of the plurality of data packets in the specified time period meets the target bit rate. The Bluetooth packet type indicates a type of a packet transmitted over Bluetooth. The Bluetooth packet type may include any one of 2DH1, 2DH3, 2DH5, 3DH1, 3DH3, and 3DH5. Each Bluetooth packet type corresponds to an upper limit of bit rate fluctuation. In this application, the target bit rate and the Bluetooth packet type both correspond to the current status of the Bluetooth channel. In other words, the target bit rate and the Bluetooth packet type are both determined based on the status of the Bluetooth channel. Therefore, the target bit rate and the Bluetooth packet type also reflect the status of the Bluetooth channel.

In the embodiment shown in FIG. 3, there is no sequence between operation 301 and operation 302.

Operation 303: Obtain one or more of a bit pool parameter set, a psychoacoustic parameter set, and a spectrum bandwidth parameter set by using a neural network obtained through pre-training based on the first audio data, the target bit rate, and the Bluetooth packet type.

A parameter in the bit pool parameter set is used to indicate a quantity of remaining bits in a bit stream that can be used for coding. In a related technology, bit rate fluctuation in a constant bit rate (CBR) coding mode is controlled through adjusting a size of a bit pool, to implement a bit rate feature of instantaneous fluctuation and long-term convergence. In this method, bit rate fluctuation is allowed in the CBR coding mode. Different quantities of bits are allocated to different audio data, to provide higher audio quality. When a quantity of actually allocated bits (a bit rate) is less than a target bit quantity (the target bit rate), remaining bits are placed into the bit pool. When a quantity of actually allocated bits is greater than the target bit quantity, some bits are extracted from the bit pool for use. Because the bit pool is not infinite, an average bit rate in a long time period in a coding process is still limited to be near the target bit rate in the CBR coding mode. A status of the bit pool in this method is determined by all historical frames and a current frame together. The status of the bit pool reflects bit rate fluctuation and a difficulty degree of compression in an entire time period from a past status to a current status. If the bit pool is large, large bit rate fluctuation may be allowed, and therefore coded audio quality is high. If the bit pool is small, small bit rate fluctuation may be allowed, and therefore coded audio quality is low.

Figure 4:
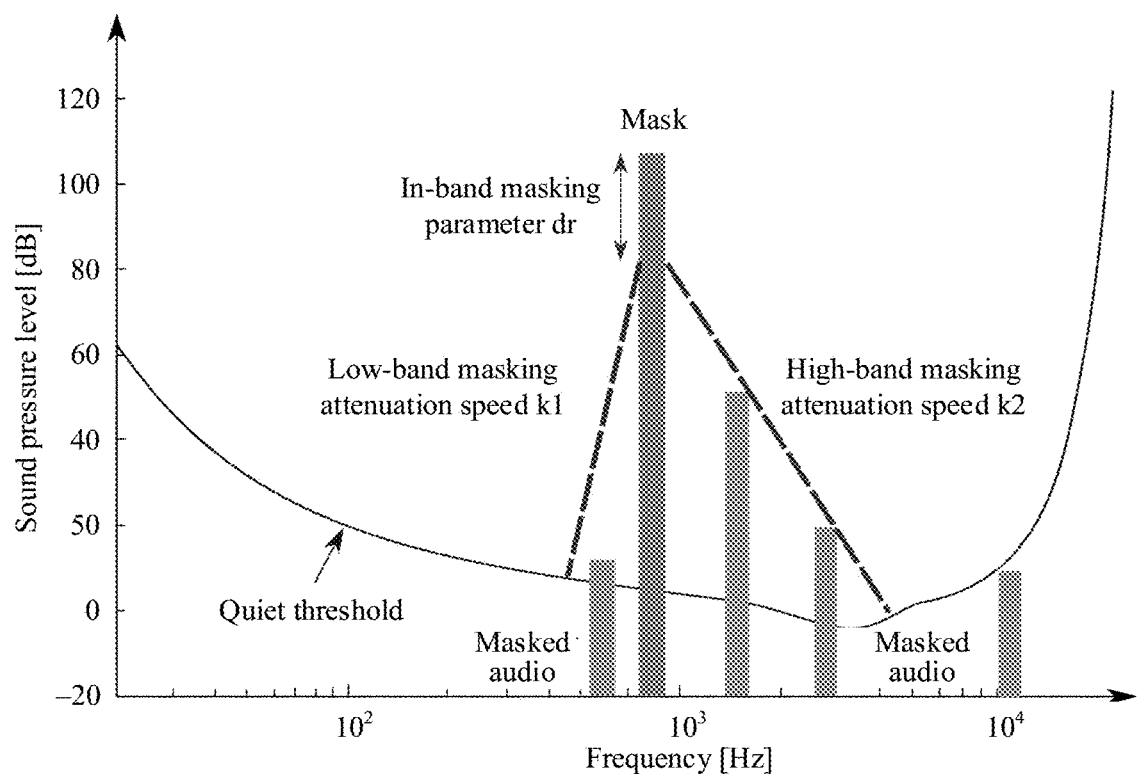
FIG. 4 is a schematic diagram of an example of a psychoacoustic process.

A parameter in the psychoacoustic parameter set is used to indicate allocation of a quantity of bits required for coding at different frequencies. In a related technology, primary information that needs to be reserved in an audio segment in the coding process and secondary information that may be ignored during coding are determined by using a psychoacoustic model. For example, FIG. 4 is a schematic diagram of an example of a psychoacoustic process. As shown in FIG. 4, a mask exists at 900 Hz with high energy, and audio, near the mask, with energy corresponding to a decibel below a dotted line cannot be heard by people. It indicates that information below the dotted line may be not coded, which reduces a bit quantity in coding. Masking is determined by three parts: an in-band masking parameter dr, a low-band masking attenuation speed k1, and a high-band masking attenuation speed k2. The three parameters: dr, k1 and k2 directly determine a bit quantity (a bit rate) of a data packet generated through coding in an AAC quantization process. If the actual bit rate of the data packet is greater than the target bit rate, dr is reduced. If the actual bit rate of the data packet is less than the target bit rate, dr is increased.

A parameter in the spectrum bandwidth parameter set is used to indicate a highest cut-off frequency of a coded audio spectrum. A higher cut-off frequency indicates corresponding richer high-frequency audio components, and can improve audio quality to an extent.

Figure 5:
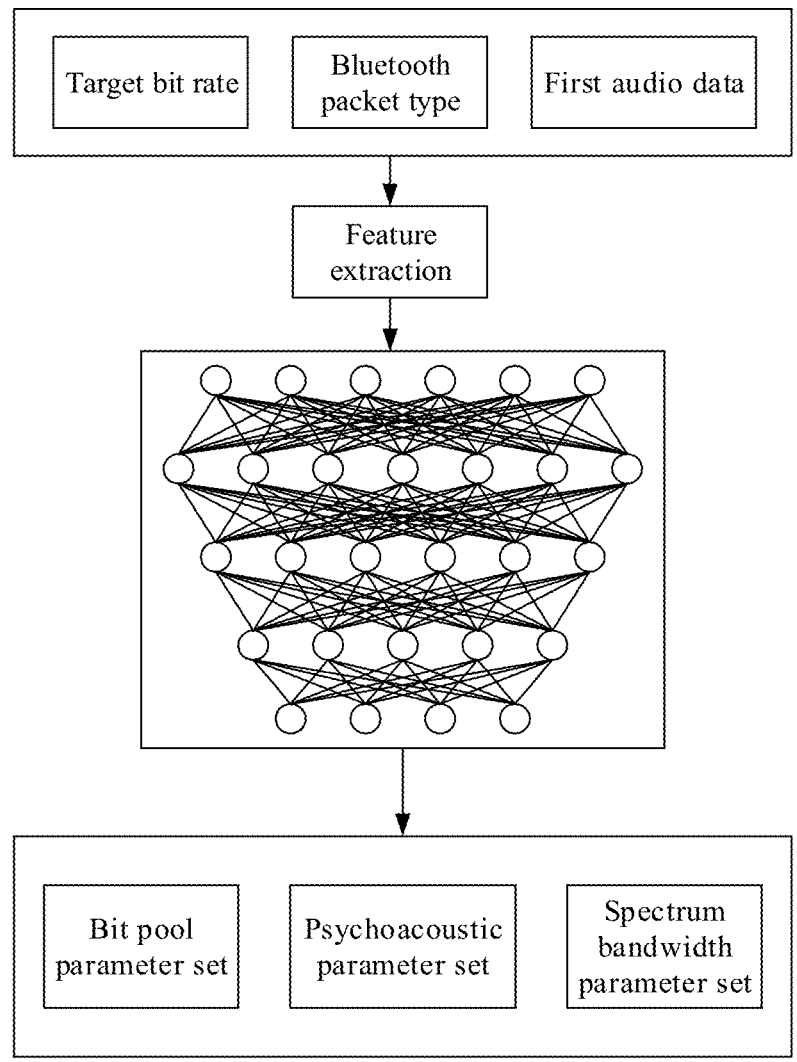
FIG. 5 is a schematic diagram of an example of a parameter obtaining method.

The terminal device may perform feature extraction on the first audio data, the target bit rate, and the Bluetooth packet type to obtain a first feature vector, and input the first feature vector into the neural network to obtain one or more of the bit pool parameter set, the psychoacoustic parameter set, and the spectrum bandwidth parameter set. FIG. 5 is a schematic diagram of an example of a parameter obtaining method. As shown in FIG. 5, the terminal device performs feature transformation on the first audio data, the target bit rate, and the Bluetooth packet type to extract a feature vector, for example, a bit rate and a Mel-frequency cepstral coefficient indicating a music feature or a linear prediction cepstral coefficient indicating a music feature. In the feature extraction process, a data dimension may be reduced, to further reduce a calculation amount. The terminal device inputs the feature vector into the pre-trained neural network to obtain one or more of the bit pool parameter set, the psychoacoustic parameter set, and the spectrum bandwidth parameter set.

It should be noted that, in this application, one or more of the bit pool parameter set, the psychoacoustic parameter set, and the spectrum bandwidth parameter set are obtained by using the neural network. In addition, the foregoing parameter sets may alternatively be obtained in manners such as another method of artificial intelligence (AI) or a mathematical operation. This is not specifically limited in this application.

In this application, the terminal device may construct a training data set of the neural network. The training data set includes a correspondence between a first value combination and a second value combination. The first value combination is any one of a plurality of value combinations of the audio data, the target bit rate, and the Bluetooth packet type. The second value combination is one of a plurality of value combinations of the bit pool parameter set, the psychoacoustic parameter set, and the spectrum bandwidth parameter set. The plurality of value combinations of the bit pool parameter set, the psychoacoustic parameter set, and the spectrum bandwidth parameter set correspond to a plurality of ODGs. The second value combination corresponds to a highest ODG. The terminal device obtains the neural network through training based on the training data set.

Figure 6:
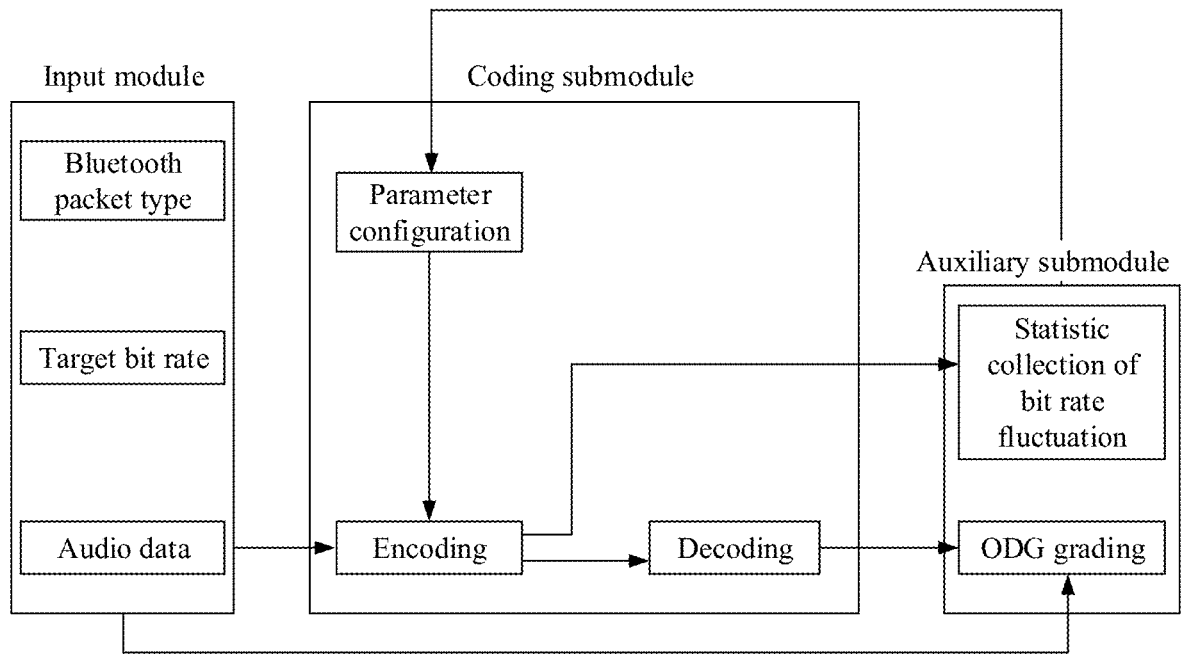
FIG. 6 is a schematic diagram of a construction method of a training data set.

For example, FIG. 6 is a schematic diagram of a construction method of a training data set. As shown in FIG. 6, the terminal device obtains a plurality of pieces of audio data. The terminal device separately codes second audio data by using the plurality of value combinations of the bit pool parameter set, the psychoacoustic parameter set, and the spectrum bandwidth parameter set in the first value combination. The second audio data is any one of the plurality of pieces of audio data. The terminal device obtains a plurality of ODGs based on a coding result. The terminal device determines, as the second value combination, a value combination corresponding to a highest ODG in the plurality of ODGs. The terminal device adds the first value combination and the second value combination to the training data set. To be specific, the terminal device first collects a large quantity of music files. Styles, types, and the like of these music files are different. Then, for audio data in each music file, in each value combination of audio data, a target bit rate, and a Bluetooth packet type, the value combination of the bit pool parameter set, the psychoacoustic parameter set, and the spectrum bandwidth parameter set constantly changes, to code the audio data by using a corresponding value combination. In addition, statistics of bit rate fluctuation of the plurality of data packets generated through coding are collected and grading is performed by using an ODG method in each time of coding. Finally, a value combination of the bit pool parameter set, the psychoacoustic parameter set, and the spectrum bandwidth parameter set corresponding to a highest ODG meeting a bit rate fluctuation requirement is output to obtain a correspondence between x=(a value combination of the Bluetooth packet type, the target bit rate, and the audio data) and y=(an optimal value combination of the bit pool parameter set, the psychoacoustic parameter set, and the spectrum bandwidth parameter set). Herein, x is input of the neural network, y is output of the neural network, and (x, y) indicates the training data set of the neural network.

Based on the training data set, the terminal device may input the extracted feature vector into the neural network for training; output the bit pool parameter set, the psychoacoustic parameter set, and the spectrum bandwidth parameter set; and compare these sets with the optimal value combination in the training data set to obtain a loss of the neural network; and finally obtain, through a large amount of backward propagation training, the converged neural network that can be used to predict different target rates, different Bluetooth packet types, and different audio data.

In a training process of the neural network, the target bit rate and the Bluetooth packet type both correspond to the status of the Bluetooth channel. Therefore, the optimal value combination of the bit pool parameter set, the psychoacoustic parameter set, and the spectrum bandwidth parameter set corresponding to the target bit rate and the Bluetooth packet type also corresponds to the status of the Bluetooth channel. It can be learned that a change of the status of the Bluetooth channel and an optimal value combination of related parameters matching the status of the Bluetooth channel are both considered for the neural network.

Operation 304: Code the first audio data based on one or more of the bit pool parameter set, the psychoacoustic parameter set, and the spectrum bandwidth parameter set to obtain a to-be-sent bit stream.

The terminal device may set parameters in one or more of the bit pool parameter set, the psychoacoustic parameter set, and the spectrum bandwidth parameter set for an encoder, and code the first audio data to obtain the coded bit stream. In this application, with reference to the coding technology in operation 303, the first audio data is coded based on one or more of the bit pool parameter set, the psychoacoustic parameter set, and the spectrum bandwidth parameter set obtained in this operation. Implementation principles are similar. Details are not described herein again. In this way, bit rate fluctuation can be limited for Bluetooth, and a relatively high audio quality level can be ensured.

In this application, based on the audio data, and the target bit rate and the Bluetooth packet type corresponding to the current status of the Bluetooth channel, a coding end (namely, the terminal device) obtains related parameters for coding by using the neural network. In this way, the status of the Bluetooth channel can be adaptively matched, and bit rate fluctuation of audio coding can be effectively reduced, to improve anti-interference performance during audio transmission and maximally ensure audio quality while providing continuous audio listening experience.

Figure 7:
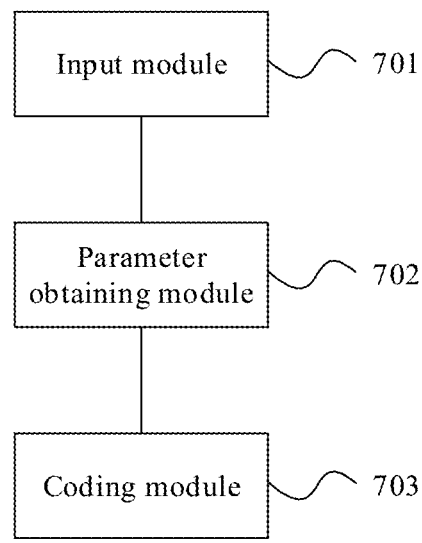
FIG. 7 is a schematic diagram of a structure of an embodiment of an audio coding apparatus according to this application.

FIG. 7 is a schematic diagram of a structure of an embodiment of an audio coding apparatus according to this application. As shown in FIG. 7, an apparatus 700 in this embodiment may include an input module 701, a parameter obtaining module 702, and a coding module 703. The input module 701 is configured to: obtain first audio data; and obtain a target bit rate and a Bluetooth packet type, where the target bit rate and the Bluetooth packet type correspond to a current status of a Bluetooth channel. The target bit rate is used to indicate an average byte quantity of a plurality of data packets generated through coding in a specified time period. The Bluetooth packet type indicates a type of a packet transmitted over Bluetooth. The parameter obtaining module 702 is configured to obtain one or more of a bit pool parameter set, a psychoacoustic parameter set, and a spectrum bandwidth parameter set by using a neural network obtained through pre-training based on the first audio data, the target bit rate, and the Bluetooth packet type. A parameter in the bit pool parameter set is used to indicate a quantity of remaining bits in a bit stream that can be used for coding. A parameter in the psychoacoustic parameter set is used to indicate allocation of a quantity of bits required for coding at different frequencies. A parameter in the spectrum bandwidth parameter set is used to indicate a highest cut-off frequency of an audio spectrum obtained after coding. The coding module 703 is configured to code the first audio data based on one or more of the bit pool parameter set, the psychoacoustic parameter set, and the spectrum bandwidth parameter set to obtain a to-be-sent bit stream.

In an embodiment, the parameter obtaining module 702 is specifically configured to: perform feature extraction on the first audio data, the target bit rate, and the Bluetooth packet type to obtain a first feature vector; and input the first feature vector into the neural network to obtain one or more of the bit pool parameter set, the psychoacoustic parameter set, and the spectrum bandwidth parameter set.

In an embodiment, the Bluetooth packet type includes any one of 2DH1, 2DH3, 2DH5, 3DH1, 3DH3, and 3DH5.

In an embodiment, the parameter obtaining module 702 is further configured to: construct a training data set of the neural network, where the training data set includes a correspondence between a first value combination and a second value combination, the first value combination is any one of a plurality of value combinations of the audio data, the target bit rate, and the Bluetooth packet type, the second value combination is one of a plurality of value combinations of the bit pool parameter set, the psychoacoustic parameter set, and the spectrum bandwidth parameter set, the plurality of value combinations of the bit pool parameter set, the psychoacoustic parameter set, and the spectrum bandwidth parameter set correspond to a plurality of ODGs, and the second value combination corresponds to a highest ODG; and obtain the neural network through training based on the training data set.

In an embodiment, the parameter obtaining module 702 is specifically configured to: obtain a plurality of pieces of audio data; separately code second audio data by using the plurality of value combinations of the bit pool parameter set, the psychoacoustic parameter set, and the spectrum bandwidth parameter set in the first value combination, where the second audio data is any one of the plurality of pieces of audio data; obtain the plurality of ODGs based on a coding result; determine, as the second value combination, a value combination corresponding to a highest ODG in the plurality of ODGs; and add the first value combination and the second value combination to the training data set.

The apparatus 700 in this embodiment may be configured to perform the technical solutions of the method embodiments shown in FIG. 3 to FIG. 6. Implementation principles and technical effects thereof are similar and are not described herein again.

Figure 8:
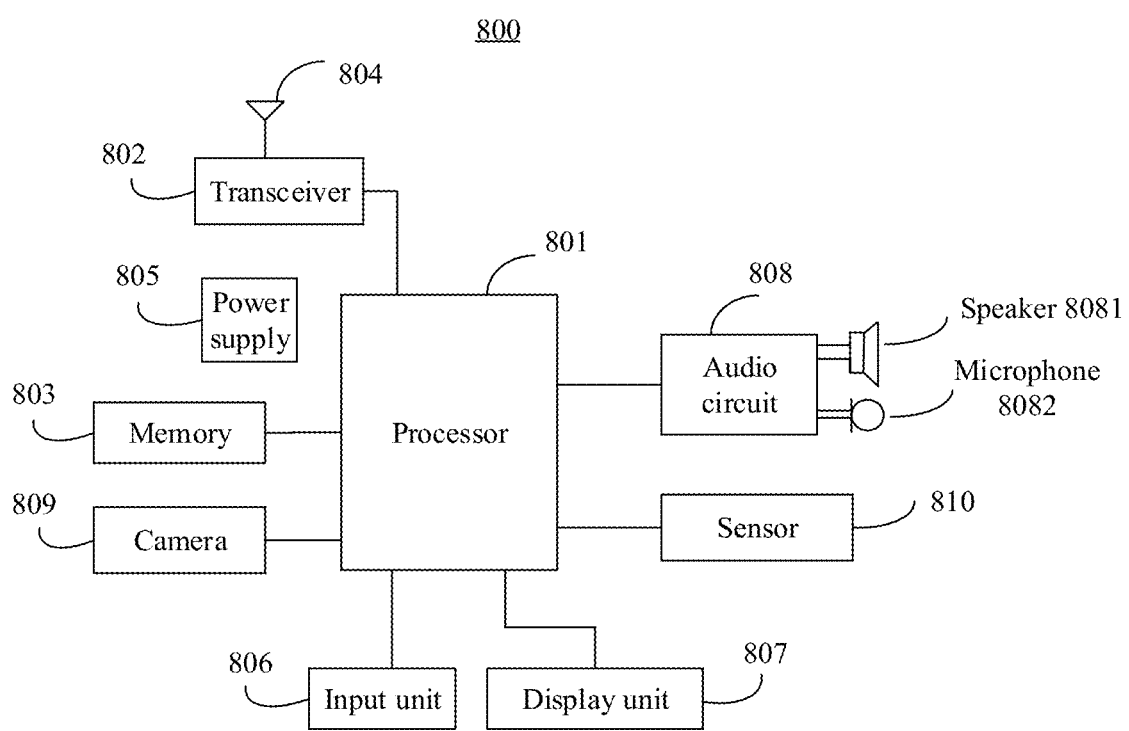
FIG. 8 is a schematic diagram of a structure of a terminal device according to this application.

FIG. 8 is a schematic diagram of a structure of a terminal device according to this application. As shown in FIG. 8, a terminal device 800 includes a processor 801 and a transceiver 802.

In an embodiment, the terminal device 800 further includes a memory 803. The processor 801, the transceiver 802, and the memory 803 may communicate with each other through an internal connection path, to transmit a control signal and/or a data signal.

The memory 803 is configured to store a computer program. The processor 801 is configured to execute the computer program stored in the memory 803, to implement the functions of the audio coding apparatus in the foregoing apparatus embodiment.

In an embodiment, the memory 803 may be integrated into the processor 801, or may be independent of the processor 801.

In an embodiment, the terminal device 800 may further include an antenna 804, configured to transmit a signal output by the transceiver 802. Alternatively, the transceiver 802 receives a signal through the antenna.

In an embodiment, the terminal device 800 may further include a power supply 805, configured to supply power to various components or circuits in the terminal device.

In addition, to implement more functions of the terminal device, the terminal device 800 may further include one or more of an input unit 806, a display unit 807 (which may be also considered as an output unit), an audio circuit 808, a camera 809, a sensor 810, and the like. The audio circuit may further include a speaker 8081, a microphone 8082, and the like. Details are not described herein.

The apparatus 800 in this embodiment may be configured to perform the technical solutions of the method embodiments shown in FIG. 3 to FIG. 6. Implementation principles and technical effects thereof are similar and are not described herein again.

In an implementation process, operations in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The operations of the methods disclosed in embodiments of this application may be directly executed and completed by using a hardware encoding processor, or may be executed and completed by using a combination of hardware and software modules in the encoding processor. The software module may be located in a mature storage medium in the art, for example, a random access memory, a flash memory, a read-only memory, a programmable read-only memory, an electrically erasable programmable memory, or a register. The storage medium is located in a memory, and the processor reads information in the memory and completes the operations in the foregoing method in combination with hardware of the processor.

The memory in the foregoing embodiments may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (random access memory, RAM), and used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the systems and methods described in this specification include but are not limited to these memories and any memory of another suitable type.

A person of ordinary skill in the art may be aware that, in combination with the examples described in the embodiments disclosed in this specification, units and algorithm operations can be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for convenient and brief description, for a detailed working process of the foregoing system, apparatus, and units, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one location, or may be distributed on a plurality of network units. Some or all of the units may be selected based on an actual requirement to achieve an objective of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (a personal computer, a server, a network device, or the like) to perform all or some of the operations of the methods described in embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of audio coding, comprising: obtaining first audio data; obtaining a target bit rate and a Bluetooth packet type, wherein the target bit rate and the Bluetooth packet type correspond to a current status of a Bluetooth channel; obtaining parameter sets using a neural network pre-trained based on the first audio data, the target bit rate, and the Bluetooth packet type, wherein the parameter sets include a bit pool parameter set, a psychoacoustic parameter set, and a spectrum bandwidth parameter set, wherein a parameter in the bit pool parameter set indicates a quantity of remaining bits in a bit stream for coding the first audio data, wherein a parameter in the psychoacoustic parameter set indicates allocation of the quantity of bits for coding the first audio data at different frequencies, and wherein a parameter in the spectrum bandwidth parameter set indicates a highest cut-off frequency of a coded audio spectrum of the first audio data; and coding the first audio data based on the parameter sets including the bit pool parameter set, the psychoacoustic parameter set, and the spectrum bandwidth parameter set to obtain a to-be-sent bit stream.

2. The method according to claim 1, wherein obtaining the parameter sets comprises:
performing a feature extraction on the first audio data, the target bit rate, and the Bluetooth packet type to obtain a first feature vector; and
inputting the first feature vector into the neural network to obtain the parameter sets.

3. The method according to claim 1, wherein the Bluetooth packet type comprises one of 2DH1, 2DH3, 2DH5, 3DH1, 3DH3, and 3DH5.

4. The method according to claim 1, wherein the target bit rate indicates an average byte quantity of data packets generated through the coding of the first audio data in a specified time period.

5. The method according to claim 1, wherein before obtaining of the first audio data, the method further comprises:
constructing a training data set for the neural network, wherein the training data set comprises a correspondence between a first value combination and a second value combination, wherein the first value combination is one of a plurality of value combinations of at least a portion of the first audio data, the target bit rate, and the Bluetooth packet type, wherein the second value combination is one of a plurality of value combinations of the bit pool parameter set, the psychoacoustic parameter set, and the spectrum bandwidth parameter set, wherein the plurality of value combinations of the bit pool parameter set, the psychoacoustic parameter set, and the spectrum bandwidth parameter set correspond to a plurality of objective difference grades (ODGs), and wherein the second value combination corresponds to a highest ODG of the plurality of ODGs; and
training the neural network based on the training data set.

6. The method according to claim 5, wherein the constructing the training data set for the neural network comprises:
obtaining a plurality of pieces of the first audio data;
separately coding second audio data by using the plurality of value combinations of the bit pool parameter set, the psychoacoustic parameter set, and the spectrum bandwidth parameter set in the first value combination, wherein the second audio data is any one of the plurality of pieces of the first audio data;
obtaining the plurality of ODGs based on a coding result;
determining, as the second value combination, a value combination corresponding to the highest ODG in the plurality of ODGs; and
adding the first value combination and the second value combination to the training data set.

7. An apparatus for audio coding, comprising: at least one processor; and a memory coupled or connected to the at least one processors, storing one or more computer programs, wherein the at least one processor is configured to execute the one or more computer programs to: obtain first audio data; obtain a target bit rate and a Bluetooth packet type, wherein the target bit rate and the Bluetooth packet type correspond to a current status of a Bluetooth channel; obtain parameter sets using a neural network pre-trained based on the first audio data, the target bit rate, and the Bluetooth packet type, wherein the parameter sets include a bit pool parameter set, a psychoacoustic parameter set, and a spectrum bandwidth parameter set, wherein a parameter in the bit pool parameter set indicates a quantity of remaining bits in a bit stream for coding the first audio data, wherein a parameter in the psychoacoustic parameter set indicates allocation of the quantity of bits for coding the first audio data at different frequencies, and wherein a parameter in the spectrum bandwidth parameter set indicates a highest cut-off frequency of a coded audio spectrum of the first audio data; and code the first audio data based on the parameter sets including the bit pool parameter set, the psychoacoustic parameter set, and the spectrum bandwidth parameter set to obtain a to-be-sent bit stream.

8. The apparatus according to claim 7, wherein the processor is configured to further execute the one or more computer programs to:
perform a feature extraction on the first audio data, the target bit rate, and the Bluetooth packet type to obtain a first feature vector; and
input the first feature vector into the neural network to obtain the parameter sets.

9. The apparatus according to claim 7, wherein the Bluetooth packet type comprises one of 2DH1, 2DH3, 2DH5, 3DH1, 3DH3, and 3DH5.

10. The apparatus according to claim 7, wherein the target bit rate indicates an average byte quantity of data packets generated through the coding of the first audio data in a specified time period.

11. The apparatus according to claim 7, wherein the processor is further configured to execute the one or more computer programs to:
construct a training data set for the neural network, wherein the training data set comprises a correspondence between a first value combination and a second value combination, wherein the first value combination is one of a plurality of value combinations of at least a portion of the first audio data, the target bit rate, and the Bluetooth packet type, wherein the second value combination is one of a plurality of value combinations of the bit pool parameter set, the psychoacoustic parameter set, and the spectrum bandwidth parameter set, wherein the plurality of value combinations of the bit pool parameter set, the psychoacoustic parameter set, and the spectrum bandwidth parameter set correspond to a plurality of objective difference grades (ODGs), and wherein the second value combination corresponds to a highest ODG of the plurality of ODGs; and training the neural network based on the training data set.

12. The apparatus according to claim 11, wherein the processor is configured to execute the one or more computer programs to:

obtain a plurality of pieces of the first audio data;

separately code second audio data by using the plurality of value combinations of the bit pool parameter set, the psychoacoustic parameter set, and the spectrum bandwidth parameter set in the first value combination, wherein the second audio data is any one of the plurality of pieces of the first audio data;

obtain the plurality of ODGs based on a coding result;

determine, as the second value combination, a value combination corresponding to the highest ODG in the plurality of ODGs; and add the first value combination and the second value combination to the training data set.

13. A non-transitory computer-readable storage medium storing a computer program, which, when executed on a computer, cause the computer to: obtain a first audio data; obtain a target bit rate and a Bluetooth packet type, wherein the target bit rate and the Bluetooth packet type correspond to a current status of a Bluetooth channel; obtain parameter sets using a neural network pre-trained based on the first audio data, the target bit rate, and the Bluetooth packet type, wherein the parameter sets include a bit pool parameter set, a psychoacoustic parameter set, and a spectrum bandwidth parameter set, wherein a parameter in the bit pool parameter set indicates a quantity of remaining bits in a bit stream for coding the first audio data, wherein a parameter in the psychoacoustic parameter set indicates allocation of the quantity of bits for coding the first audio data at different frequencies, and wherein a parameter in the spectrum bandwidth parameter set indicates a highest cut-off frequency of a coded audio spectrum of the first audio data; and code the first audio data based on the parameter sets including the bit pool parameter set, the psychoacoustic parameter set, and the spectrum bandwidth parameter set to obtain a to-be-sent bit stream.

14. The non-transitory computer-readable storage medium of claim 13, wherein the computer program when executed on the computer, further causes the computer to:

perform a feature extraction on the first audio data, the target bit rate, and the Bluetooth packet type to obtain a first feature vector; and input the first feature vector into the neural network to obtain the parameter sets.

15. The non-transitory computer-readable storage medium of claim 13, wherein the Bluetooth packet type comprises one of 2DH1, 2DH3, 2DH5, 3DH1, 3DH3, and 3DH5.

16. The non-transitory computer-readable storage medium of claim 13, wherein the target bit rate indicates an average byte quantity of data packets generated through coding the first audio data in a specified time period.

17. The non-transitory computer-readable storage medium of claim 13, wherein the computer program when executed on the computer, further causes the computer to:

construct a training data set for the neural network, wherein the training data set comprises a correspondence between a first value combination and a second value combination, wherein the first value combination is one of a plurality of value combinations of at least a portion of the first audio data, the target bit rate, and the Bluetooth packet type, wherein the second value combination is one of a plurality of value combinations of the bit pool parameter set, the psychoacoustic parameter set, and the spectrum bandwidth parameter set, wherein the plurality of value combinations of the bit pool parameter set, the psychoacoustic parameter set, and the spectrum bandwidth parameter set correspond to a plurality of objective difference grades (ODGs), and wherein the second value combination corresponds to a highest ODG of the plurality of ODGs; and training the neural network based on the training data set.

18. The non-transitory computer-readable storage medium of claim 17, wherein the computer program when executed on the computer, further causes the computer to:

obtain a plurality of pieces of the first audio data;

separately code second audio data by using the plurality of value combinations of the bit pool parameter set, the psychoacoustic parameter set, and the spectrum bandwidth parameter set in the first value combination, wherein the second audio data is any one of the plurality of pieces of the first audio data;

obtain the plurality of ODGs based on a coding result;

determine, as the second value combination, a value combination corresponding to the highest ODG in the plurality of ODGs; and add the first value combination and the second value combination to the training data set.

* * * * *